US006830799B1

(12) United States Patent
Duffin et al.

(10) Patent No.: US 6,830,799 B1
(45) Date of Patent: *Dec. 14, 2004

(54) EXPANDABLE COMPOSITIONS AND METHODS OF MAKING AND USING THE COMPOSITIONS

(75) Inventors: Gary Raymond Duffin, Liberty, MO (US); Michael Allen Lupini, Milford, MI (US); Donald W. Taylor, Liberty, MO (US); Peter Tkacz, Rudgy (GB)

(73) Assignee: Orbseal LLC, Richmond, MO (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/696,854

(22) Filed: Oct. 26, 2000

Related U.S. Application Data (60) Provisional application No. 60/219,095, filed on Jul. 18, 2000, and provisional application No. 60/161,528, filed on Oct. 26, 1999.

(51) Int. Cl.[7] ............................... B32B 3/10; C08J 9/10
(52) U.S. Cl. ..................... 428/131; 428/36.7; 521/135; 521/178
(58) Field of Search ............................. 428/131, 36.7; 521/135, 178, 95, 134, 139; 220/364, 592.25, DIG. 19

(56) References Cited

U.S. PATENT DOCUMENTS

| 4,250,997 A | * | 2/1981 | Bodenmann et al. | |
| 4,680,316 A | | 7/1987 | Douglas | 521/139 |
| 4,745,015 A | * | 5/1988 | Cheng et al. | |
| 5,118,531 A | | 6/1992 | Petersen et al. | 427/230 |
| 5,266,133 A | | 11/1993 | Hanley et al. | 521/139 |
| 5,307,985 A | * | 5/1994 | Beizermann | |
| 5,373,027 A | | 12/1994 | Hanley et al. | 521/84.1 |
| 5,462,975 A | | 10/1995 | Yamamoto et al. | |
| 5,506,025 A | | 4/1996 | Otto et al. | |
| 5,804,608 A | * | 9/1998 | Nakazato et al. | |
| 6,150,428 A | | 11/2000 | Hanley, IV et al. | 521/135 |
| 6,242,503 B1 | * | 6/2001 | Kozma et al. | 521/134 |
| 6,262,137 B1 | * | 7/2001 | Kozma et al. | 521/134 |
| 6,368,438 B1 | * | 4/2002 | Chang et al. | |
| 6,575,526 B2 | | 6/2003 | Czaplicki et al. | |
| 6,677,020 B2 | | 1/2004 | Dron | |

FOREIGN PATENT DOCUMENTS

WO        WO 93/00381        7/1993

OTHER PUBLICATIONS

International, Oct. 26, 2000, PCT Notification of Transmittal of the International Search Report or the Declaration.

* cited by examiner

*Primary Examiner*—Morton Foelak
(74) *Attorney, Agent, or Firm*—Michael K. Boyer (57) ABSTRACT

A novel expandable composition and method for using the same are disclosed. The disclosed method relates to using the composition, for example, as an automotive cavity sealant. The inventive composition normally is a combination of at least one base polymer, at least one expansion or blowing agents, at least one hydrocarbon resin, at least one curing agent or catalyst and optionally at least one additives such as a supplemental polymer, colorant, tackifier, processing oil, among others.

10 Claims, 6 Drawing Sheets

EXPANDABLE COMPOSITIONS AND METHODS OF MAKING AND USING THE COMPOSITIONS

The subject matter herein claims benefit of prior filed U.S. Patent Application Ser. Nos. 60/161,528, filed on Oct. 26, 1999 and 60/219,095, filed on Jul. 18, 2000; the disclosure of which is hereby incorporated by reference.

FIELD OF THE INVENTION

The instant invention relates to a novel expandable composition. The instant invention also relates to a method of using the composition, for example, as an automotive cavity sealant.

BACKGROUND OF THE INVENTION

Expandable sealants are known in this art such as described in U.S. Pat. Nos. 4,427,481; 4,874,650; 5,266,133; 5,373,027; 5,506,025; 5,266,133; 5,373,027; and 5,678,826; and European Patent No. EP 0 730 998B1; the disclosure of each of which is hereby incorporated by reference. One conventional cavity sealing arrangement and method is described in U.S. Pat. No. 5,040,803; the disclosure of which is also hereby incorporated by reference. Other convention cavity sealants comprise polyvinyl chloride (PVC) based materials that are pumped into location and, in some cases, expand after being exposed to a sufficient amount of heat. Conventional sealants also include polyurethane based or containing foams. Typically, these sealants are employed in automotive applications for filing cavities, stiffening adjacent components and dampening sound/vibrations. Conventional sealant compositions may be limited in their application due to the temperature and time required to cause the sealant to expand. Certain conventional compositions also require the addition of heat to produce the expandable composition as well as to cause the composition to expand. There is a need in this art for an expandable composition that: 1) is activated at a relatively low temperature, 2) adheres to a metal substrate, 3) is easily installed and remains in a predetermined location and 4) for some applications is resistant to fuel, e.g., diesel and gasoline.

SUMMARY OF THE INVENTION

The instant invention solves problems associated with conventional sealants and methods by providing a novel composition that can be molded into a predetermined shape and expanded by being exposed to a sufficient amount of heat, e.g., an external source of heat. In contrast to conventional sealants, the inventive composition can: 1) have a predetermined shape, e.g., by injection molding, 2) located, e.g., within a cavity, or around or upon a member to be sealed, prior to/post assembly while remaining in a predetermined location, 3) employed in a wide range of applications, 4) produced at relatively low temperatures; 5) expanded at relatively low temperatures, e.g, after being installed within a cavity; and 6) recycled as scrap material post cure.

The inventive composition may be employed in automotive applications, e.g., the composition may be used in accordance with the guidelines set forth in Ford Specification No. ESB-M 18P11 A, WSB-M 18P11A2, General Motors Specification No. 9984188 C/D/G and Daimler-Chrysler Specification No. MS-CD 627 B/E, 644, and 466; the disclosure of these Specifications is hereby incorporated by reference.

By tailoring the inventive composition, the expansion initiation temperature of the composition, degree of expansion, time until fully expanded, among other processing characteristics, can be predetermined to satisfy a wide range of end-uses. The inventive composition can expand about 450 to about 800 volume % at temperatures of about 250 to about 375 F. (adjacent metal temperature), depending upon the characteristics of the composition. When the heat of expansion is provided from a powder coat system, the temperature can be 385 F. to about 400 F. For example, the inventive composition can expand at least about 500% at a temperature of about 300 F. Depending upon the desired expansion rate and expansion initiation temperature, the inventive composition can be tailored to expand 800 to 1,000% and have expansion initiation temperatures from about 120 to 170 C. (adjacent metal temperature).

DETAILED DESCRIPTION

The inventive composition broadly comprises a combination of at least one base polymer, at least one expansion or blowing agents, at least one hydrocarbon resin, at least one curing agent or catalyst and optionally at least one additives such as a supplemental polymer, colorant, tackifier, processing oil, among others.

While any suitable base polymer or mixtures thereof can be employed, an examples of suitable polymers comprise at least one member from the group of styrene butadiene rubber, a modified ethylene copolymer blend such as maleic anhydride modified copolymer of ethylene and vinyl acetate, among others. Such polymers are available commercially as Bynel™ CXA 3860 (supplied by The DuPont Company, Wilmington, Del.). Normally, the base polymer corresponds to about 55 to about 84 wt. % of the composition prior to expansion. When a fuel resistant composition is desired, a base polymer can comprise at least one member selected from the group consisting of epoxies, epoxy functional compounds, modified polyethylene blends, mixtures thereof, among others.

Any suitable expansion or blowing agent can be employed that becomes or generates a gaseous or vapor phase (e.g., nitrogen, carbon dioxide, etc.), when exposed to a sufficient amount of heat. Examples of such expansion agents comprise at least one of azodicarbonamides and p,p'-oxybis(benzene-sulfonyl hydrazide) or diphenylozide-4, 4'-disulphohydrazides supplied, respectively, by Uniroyal as Celogen™ 765 and Celogen™ OT. Typically, the expansion agent comprises about 1 to about 15 wt. % of the composition prior to expansion. The amount of expansion agent can be tailored depending upon the temperature/time, desired degree of expansion, time permitted for expansion, among other parameters. Generally, higher concentrations of Celogen™ OT are employed in conjunction with urea (e.g., BIK OT supplied by Uniroyal Chemical Company) for relatively low temperature expansion whereas Celogen™ 765 accommodates higher temperature expansion.

In some cases, the expansion or blowing agent has been treated. By treated it is meant that the expansion or blowing agent has been contacted or admixed with a suitable binder, e.g, binder comprising at least one of napthenic, glycerins, polyols, ethylene propylene monomer, paraffinic, among others. For example, an expansion agent comprising Celogen™ OT has been admixed with a naphtheninc binder for safety and despersion. Examples of suitable binders comprise those commercially supplied by Polychem, PPD celot 90, ElastoChem, OT-72 AkroChem, and mixtures thereof. The ratio of expansion agent to binder normally ranges from about 5 to about 30%. Notwithstanding the binder the expansion agent is typically at least about 90% active.

Moreover, the expansion or blowing agent can be encapsulated within a shell. That is, a liquid or gaseous blowing agent is combined with or encapsulated within a thermoplastic particle or powder, e.g., a hydrocarbon encapsulated within an acrylonitrile shell as in Expancel® that is supplied by Expancel Inc., a division of Akzo Nobel Industries. For example, the shells can be fabricated from polyolefins such as polyethylene and polypropylene; vinyls, EVA, nylon, acrylics, among other materials. The shells are selected to melt, soften, expand, rupture or retain their physical configuration depending upon whether or not an open or a closed cell expanded material is desired. The shells can also comprise a distribution of differing particle sizes, composition and activation temperatures, e.g., a foam precursor comprising at least two different particle sizes and activation temperatures. Specific examples of suitable encapsulated blowing agents comprise at least one member selected from the group of hydrocarbons such as isobutane and isopentane; fluorocarbons such as 1-1dichloroethene, HFC-134a, HFC-152a; and nitrogen releasing chemical blowing agents such as those supplied as Celogen® by UniRoyal that are encapsulated within any suitable thermoplastic, e.g., 2-methyl 2-propenioc acid methyl ester polymer with 2-propenenitrile and vinylidene chloride polymer and polyvinylidene fluoride. These materials are supplied commercially by Expancel, Inc., a division of Akzo Nobel as Expancels® 051WU, 051DU, 091DU80, 820WU, 820DU, 642DU, 551WU, 551WU80, 461DU or Micropearl® F30D supplied by Pierce and Stevens. These materials can be supplied in either dry or wet form. These materials can also be coated with any suitable material for controlling the activation temperature of the encapsulated blowing agents. An example of a coating comprises an acrylated materials, waxes, among other materials. Depending upon the physical characteristics desired in the foam, the shells can be used to obtain open or closed cells.

The inventive composition can comprise any suitable hydrocarbon resin or mixtures thereof that accommodates the expansion temperature, e.g, at least about 300 F. Examples of suitable resins are rosin esters, polyterpenes, an aliphatic or aromatic hydrocarbon resins, e.g, C5 to C9 hydrocarbon and aromatically modified hydrocarbon resins, mixtures thereof, among others. Suitable resins are available commercially as Piccotac® supplied by Hercules Incorporated, Wilmington, Del. or Escorez® supplied by Exxon Chemical Co., Houston, Tex., Zonester® by Arizona Chemicals, and Wingtac® by Goodyear. Normally, for best results, the hydrocarbon resin can be crushed or ground to form a particulate material, e.g., the particle size normally pass through 80% at 40 mesh and 100% at 30 mesh. The hydrocarbon resin can comprise or consist essentially of about 1 to about 15 wt. % of the inventive composition prior to expansion.

The inventive composition normally comprises at least one curing agent or catalyst such as tetramethylthiuram disulfide, e.g., TMTD applied by Akrochem Corporation, Akron, Ohio, organic peroxide by AkroChem, and urea or urea modified materials (e.g., surface treated), e.g., BIK-OT by Uniroyal Chemical Company. Without wishing to be bound by any theory or explanation, it is believed that the catalyst functions as a source of sulfur and enhances the quality of the fine closed cells in the expanded product. The amount of curing agent typically corresponds to about 0 to about 5 wt. % of the composition prior to expansion.

The inventive composition can also comprise at least one supplemental polymers. An example of a suitable supplemental polymer comprises polybutadiene rubber, ethyl vinyl acetate, ethylene propylene diene monomer (EPDM), ethylene-acrylic acid polymer such as Primacor™ 5990 polymer supplied by The Dow Chemical Company, Midland, Mich. The amount of optional supplemental polymer normally corresponds to about 5 to about 10 wt. % of the composition.

Further, the composition can also comprise at least one additive such as a colorant, tackifier, filler, plasticizer, processing oil, antimicrobial agents, UV curing agents, magnetic/magnetisable materials, among others. One suitable additive comprises EPDM. While any desirable colorant can be added to the composition, green or blue colorant supplied by Akron Chemical Company, Akron, Ohio as Akrochem 626 and 633 powder are effective. The total amount of additives, if present, corresponds to about 0 to about 5.0 wt. % of the composition before expansion. Virtually any additive can be added so long as the additive does not adversely impact the processability or expanded composition characteristics. In some cases for ease of handling, additives to the inventive composition (e.g., colorant, tackifier, filler, plasticizer, processing oil, antimicrobial agents, among others), are blended into pellets and subsequently combined with the remaining components of the inventive composition.

While the presence of ionomeric compounds does not adversely impact the utility of the inventive composition, in one aspect of the invention the composition can be substantially free of ionomeric compounds. By "substantially free" it is meant that the composition has less than about 20 parts or 5.5 wt. % of ionomeric compounds, e.g., usually about 0 wt. % of ionomers. Examples of such ionomeric compounds that may be obviated by the instant invention are disclosed in the aforementioned U.S. Pat. No. 5,266,133. The ability to obviate ionomeric compounds reduces cost of the composition as well as enhances processability.

The inventive composition can be produced by mixing the components in any suitable apparatus, e.g., a dispersion mixer or twin screw, or continuous mixer. With the exception of the optional processing oil/plasticizers, the components of the inventive composition are solids under ambient conditions. Once mixed, the combination can be shaped by employing any expedient method such as blow molding, injection molding, compression molding, die cutting, extrusion, among other methods. Depending upon the configuration of the shaped inventive composition, normally injection molding or extrusion is preferred. For example, the inventive composition can be fabricated to possess the configuration of FIGS. 1A and 1B (described below in greater detail) by employing a single cavity injection mold, or a single cavity profile extruder. Injection molding can employ a Toyo Model TM200 molding machine with a water jacket around the barrel set at about 160 F., a mold temperature set at about 70 F., and a cycle time of approximately 30 seconds. Extrusion can employ conventional equipment and extrude a length of material having the same cross-section as an injection molded component. When extruding, the length of the material can be continuous and then cut at suitable increments, e.g., four (4) inch increments. An example of a conventional extruder comprises a 12/1 extruder with a standard flight screw, with a feed rate of about 150 lbs/hr, 160 F. feed temperature, 200 F. barrel temperature, and 200 F. profile extrusion temperature. Normally, the extruded profile is immediately cooled by a chilled water bath to help maintain its shape. The extruded profile can possess any suitable configuration such as a circle, oval, square, pentagon, curvilinear shapes, among others.

The inventive composition can be shaped into a two or three dimensional configuration, or pumped to a location prior to expansion. For example, the composition can be injection molded into a hollow or solid cylindrical shape that is in turn located within an automotive cavity during assembly, e.g., formed reinforcement tubes/channels, rocker panel or pillar cavities, among other areas/cavities. After being properly positioned (e.g., within an automotive cavity), the composition expands when exposed to the relatively high temperatures employed in subsequent processing, e.g., bake cyles, electrodeposition, painting, among other assembly procedures.

The inventive composition can be associated with or adhered to a virtually unlimited array of substrates such as electrocoated surfaces, e.g., panels including automotive components, cold rolled steel, galvanized surfaces, galvanel surfaces, galvalum, galfan, among others. The substrate or surface that contacts the inventive composition can also comprise a painted surface, ceramic, glass, thermoplastic, thermosets, among others.

In one aspect of the invention, the inventive composition is employed as a component of a composite structure. That is, the composition can be located or sandwiched between at least two metal layers thereby forming a so-called constraint layer damper. The composition may also be shaped into a thin-walled article having a continuous surface and at least one internal cavity. The composition can also be shaped to produce the articles disclosed in U.S. Pat. No. 5,678,826.

In another aspect, the instant invention relates to an expandable material having a predetermined configuration or shape. In particular the expandable material can be configured into a shape that retains the expandable material at or within a defined location, e.g., an expandable material comprising an acoustical material located within an automotive cavity. The expandable material can be shaped so as to be self-retaining. By "self-retaining" it is meant that the expandable material after being placed in a defined location and position/orientation maintains the placement for a predetermined length of time (e.g., until being heated to expand) without utilizing separately applied fasteners. Self-retaining properties can achieved by shaping the expandable material into a clip, wedge, strap, bolt, among other shapes designed to mechanically maintain the expandable material at a predetermined placement. The self-retaining properties can also be achieved by compression fitting. While the self-retaining expandable material can be produced from any suitable composition, the composition disclosed herein is particularly useful. For example, a self-retaining expandable can be formed from the inventive composition such that the expandable material has a unitary structure that includes a fastener. That is, the fastener would function to retain the expandable material in a predetermined location and expand (upon heating) to assist in sealing. The unity self-retaining structure can be tailored to have a configuration including an integral fastener for a specific area, void or cavity to be sealed.

In a further aspect, the instant invention relates to an expandable material having a predetermined shape or configuration and having at least one fastener that retains the expandable material at a predetermined location. The fastener can maintain the fastener at any suitable predetermined location such as an automotive front and/or rear "A"-pillar, "B"-pillars, "C"-pillar, among other locations where it is desirable to position an expandable material adjacent to a member to be sealed. By "adjacent" it is meant term "adjacent" as used in this specification and the claims, unless expressly stated otherwise, means two components that are in contact with each other, are next to each other with a space separating them, or are next to each other with a third component in between. By "member to be sealed" it is meant that the material contacts the member either prior to, during or after completing expansion. The member to be sealed can be at least partially embedded or penetrated by the expanding material. The fastener can be attached to or incorporated within the material prior to expansion. While any suitable fastener can be employed, examples of suitable fasteners comprise at least one member selected from the group of blades, pins, push-pins, clips, compression fit fasteners, among other fasteners that are capable for maintaining a shaped expandable composition in a predetermined location without adversely affecting the expansion or performance of the composition. Specific examples of suitable fasteners are described in aforementioned U.S. Pat. Nos. 5,040,803 and 5,678,826.

Figure 1A:
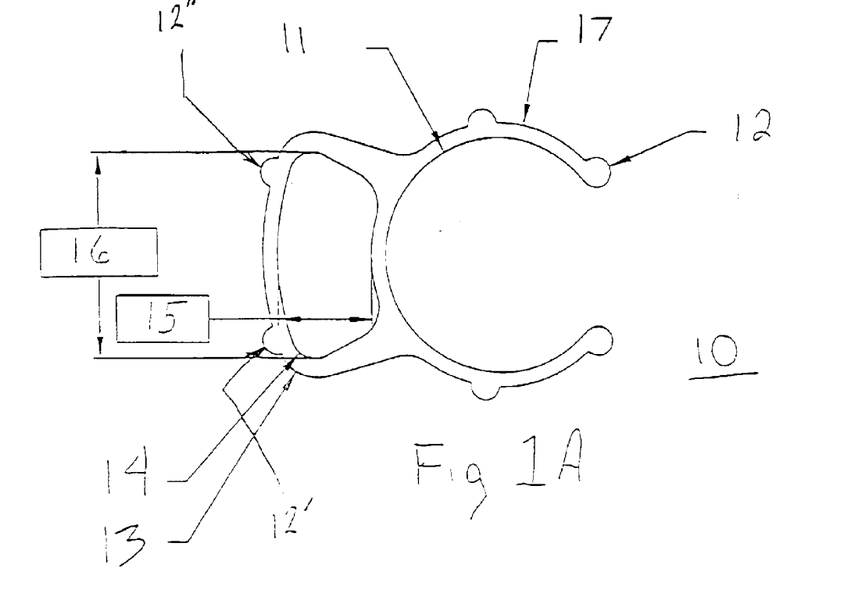
FIG. 1A is an end-view of a cross-section of one aspect of the instant invention.

Certain aspects of the invention are better understood when referring to the Drawings. Referring now to the Drawings, FIG. 1A illustrates an expandable material 10 of the instant invention. The expandable material possesses a circular gripping area 11. The portion 12 of material 10 that is adjacent to an opening in the circular gripping area 11 can function to improve the durability of the material 10 and/or provide increased material for subsequent expansion. The expandable material 10 is retained or clipped around a first automotive member (not shown) having a generally circular cross-section. The expandable material 10 generates a sufficient compressive strength to maintain the material at a predetermined location. The portion 13 of material 10 defines an opening 14. The width 15 of opening 14 is greater than or equal to the distance between a first automotive member within area 11 and a second automotive member (not shown) in contact with portion 12' and 12". This distance permits the material to grip the first automotive member while also being compressed between the first and second automotive members. The length 16 of opening 14 causes or is sufficient to provide a volume of expandable material between the first automotive member and the second automotive member, and to add strength to the gripping action of area 11. The length of 16 will increase or decrease as the diameter of 11 increases or decreases, respectively. The material can possess a wide range of dimensions; however, normally, the wall thickness shown at portion 17 is about 2 to about 4 mm, dimension 14 about 2 to about 4 mm, the dimension 16 about 25 to about 35 mm and the overall length of 10 about 25 to about 45. When the expandable material is obtained by extrusion the length of 16 can be greater than 20 mm.

When the material is exposed to sufficient heat (e.g., about 250 to about 375 F.), the aforementioned expansion agent causes substantially all of the material to increase in volume and bond to adjoining surfaces, e.g, metal surfaces. While the material illustrated in FIG. 1A is intended to contact an automotive door intrusion beam and the interior surface of the door, the composition can also be shaped for use as a sound damper/absorber in an "A" pillar, rear trunk sealant, among other areas in an automobile for use in controlling sound, water, wind and dust.

Figure 1B:
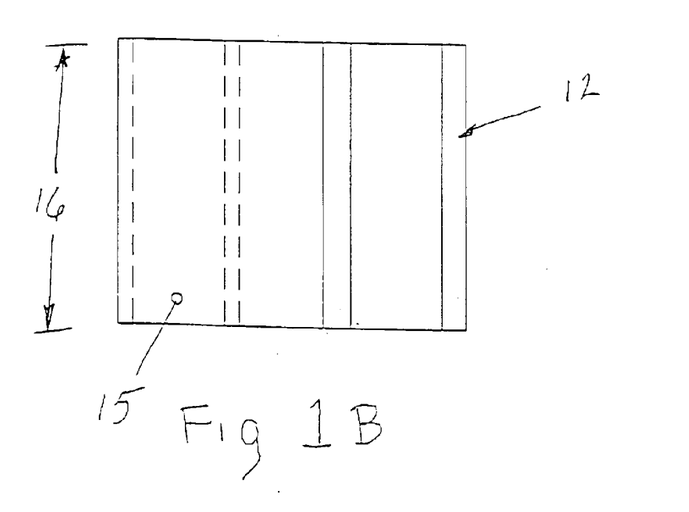
FIG. 1B is a side-view of the product illustrated in FIG. 1A.

Referring now to FIG. 1B, FIG. 1B illustrates the expandable material illustrated in FIG. 1B in cross-section format. While the composition shown in FIG. 2 is intended to be affixed to a beam having a circular cross-section, the composition can be employed with beams or members having a virtually unlimited array of cross-sections. The composition also can be molded into a wide variety of shapes, e.g., strips, rods, curvilinear, among others, and sizes.

Figure 2A:
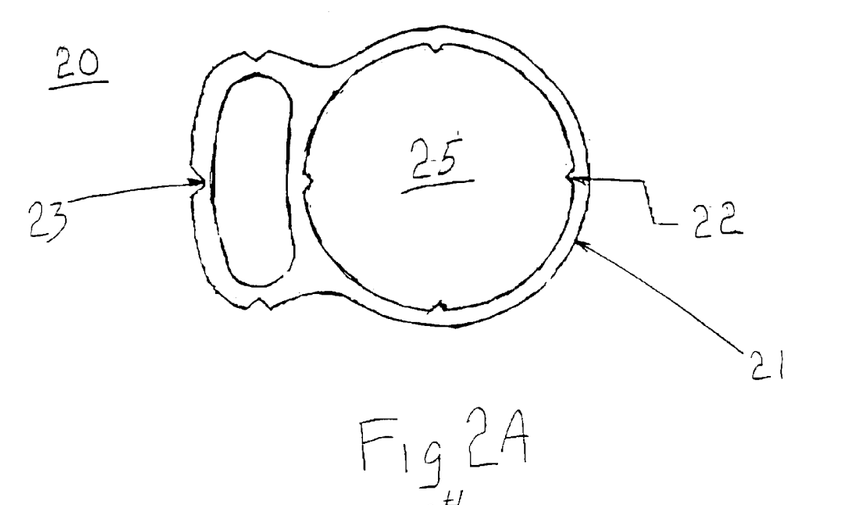
FIG. 2A is an end-view of a cross-section of another aspect of the instant invention.

Referring now to FIG. 2A, FIG. 2A illustrates an expandable material having a similar configuration to that illustrated in FIGS. 1A and 1B except that the expandable material 20 has an enclosed gripping area 21. The expandable material illustrated in FIG. 2A is configured such that the material can be inserted onto another member, e.g., a circular cross-section intrusion beam. Gripping area 21 includes protuberances 22 that are compressed when another member, e.g,. a pipe, is inserted through material 20. By compressing protuberances 22, friction is created between the protuberances and the outer surface of the inserted member and thereby functioning to maintained material 20 at a fixed location upon the member.

Material 20 can define at least one slot or groove 23. These slots or grooves 23 provide locations where the material 20 can be compressed or bent. The ability to bend the material 20 permits locating the material at a given location without breaking or cracking the material.

Figure 2B:
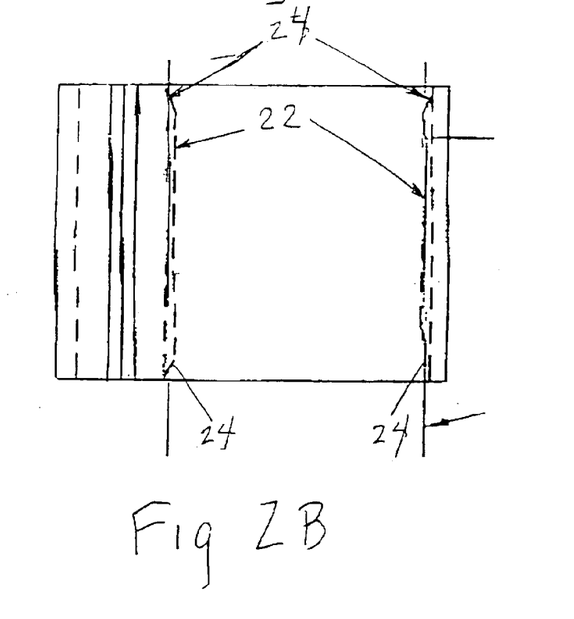
FIG. 2B is a side-view of the product illustrated in FIG. 2A.

Protuberances 22 can possess any suitable configuration. One such configuration is illustrated in FIG. 2B. Referring now to FIG. 2B, FIG. 2B illustrates the expandable material illustrated in FIG. 2A in cross-section format. The end of protuberance 22 has a radius 24 that terminates at each end of the opening or hole 25 defined within material 20. The terminating radius permits more expedient insertion of a member into or through material 20.

Figure 3A:
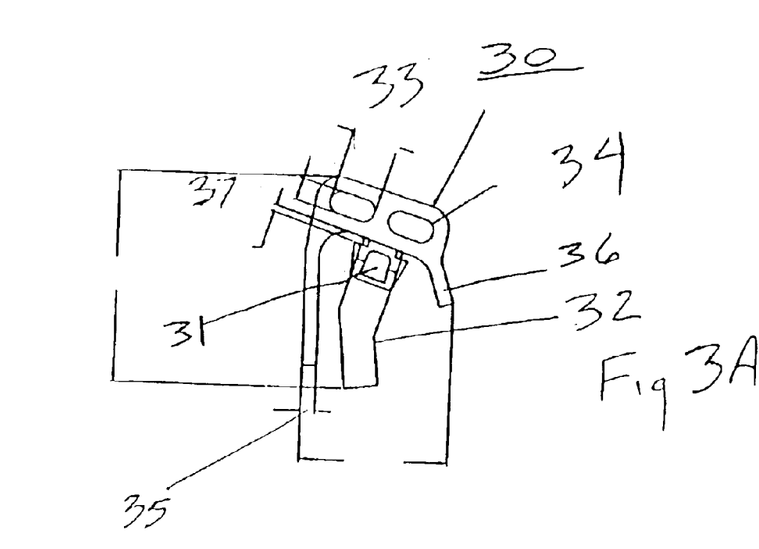
FIG. 3A is a first side-view of a further aspect of the instant invention that includes a fastener for use in sealing an automotive A-pillar.
Figure 3B:
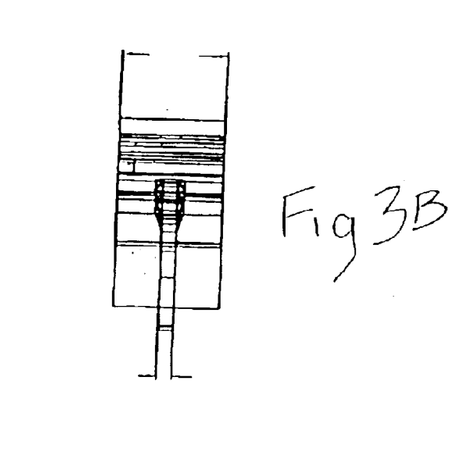
FIG. 3B is a second side-view of the product illustrated in FIG. 3A
Figure 3C:
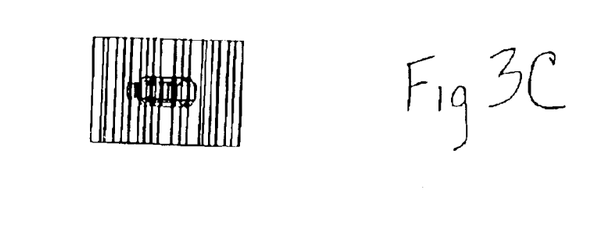
FIG. 3C is an end-view of the product illustrated in FIG. 3A.

Referring now to FIGS. 3A–3C, FIGS. 3A–3C illustrate a further aspect of the invention wherein an automotive sealant comprises an integral fastener that is employed for maintaining the inventive expandable composition in a predetermined position, e.g., self-retaining. Expandable material 30 having a integral clip type fastener 31 (also comprising the inventive expandable material) that maintains material 30 adjacent to and within an automotive A pillar (not shown). Fastener 31 also includes a leg or protuberance 32 that extends into the A-pillar. Material 30 defines openings 33 and 34. These openings can be employed for reducing mass (and material costs), enhancing flow of heat through the expandable material (thereby ensuring uniform expansion and lower activation temperature) and permitting fluids to flow through the material (e.g., automotive e-coat, metal treatments, among other fluids). Material 30 comprises extensions 35 and 36 that extend along an exterior surface of the A-pillar. The material 30 is attached to an A-pillar by inserting fastener 31/32 into the A-pillar such that extensions 35 and 36 contact the exterior surface of the A-pillar. The distance shown by 37 corresponds to the thickness of the A-pillar. When material 30 is exposed to an adequate amount of heat, all of material 30 (including fastener 31 and extensions 35/36) expands thereby sealing the A-pillar.

Figures 4A, 4C:
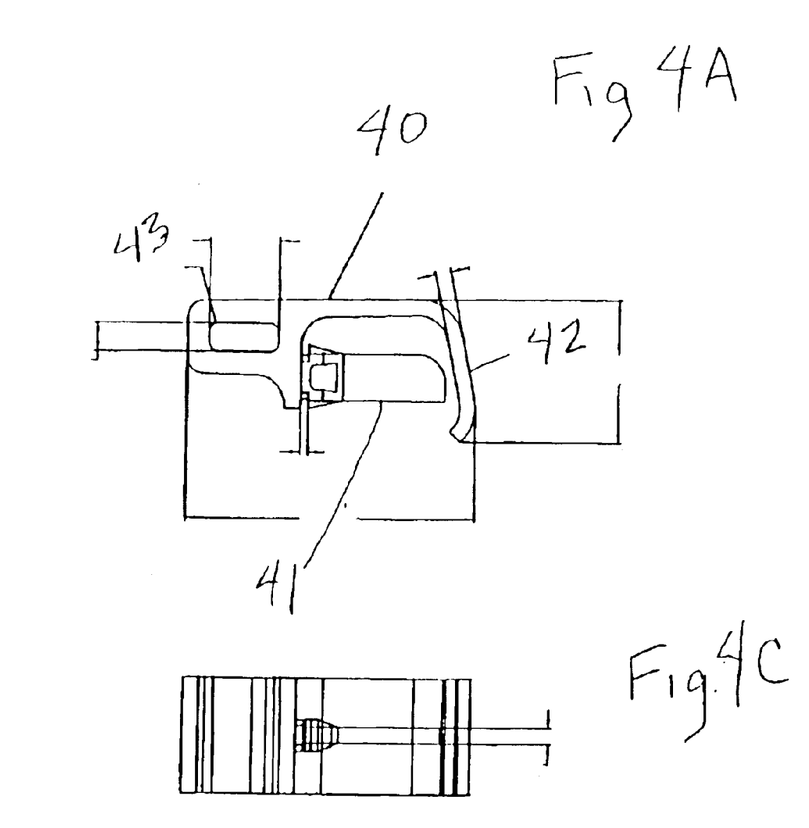
FIG. 4A is a first side-view of a further aspect of the instant invention that includes a fastener for use in sealing an automotive front B-pillar.
FIG. 4C is an end-view of the product illustrated in FIG. 4A.
Figure 4B:
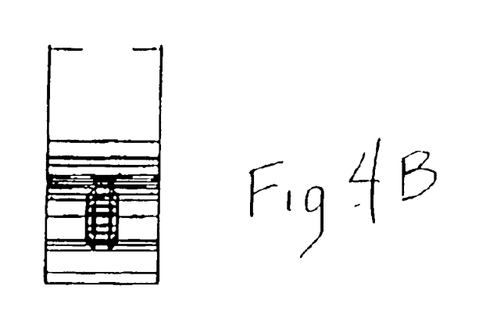
FIG. 4B is a second side-view of the product illustrated in FIG. 4A.

Referring now to FIGS. 4A–4C, FIGS. 4A–4C illustrate an expandable material having a similar configuration to that illustrated in FIGS. 3A–3C except that the expandable material 40 includes an expandable clip type fastener 41 that is oriented toward extension 42. Material 40 defines an opening 43 that functions in the manner described above in connection with openings 33/34. While material 40 can be employed for a wide range of end-uses, material 40 is particularly suited for sealing an automotive front B-pillar.

Figure 5A:
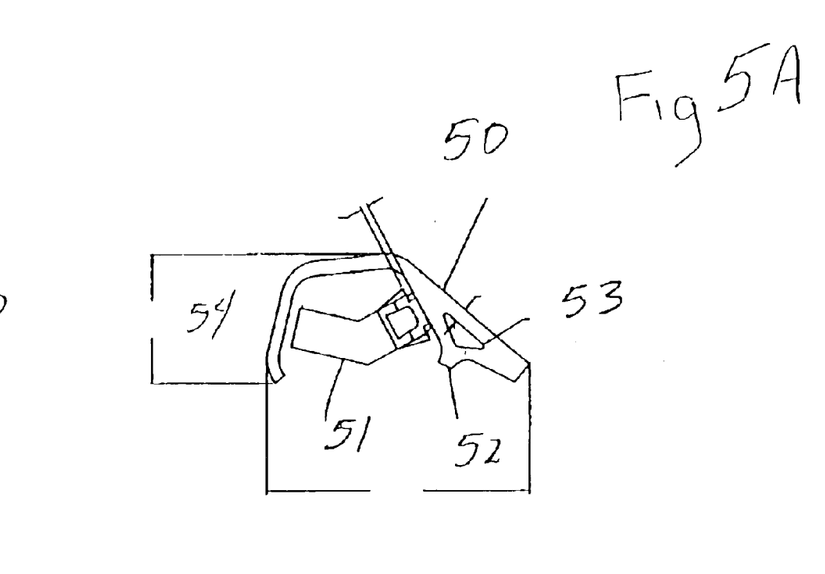
FIG. 5A is a first side-view of a further aspect of the instant invention that includes a fastener for use in sealing an automotive C-pillar.
Figure 5B:
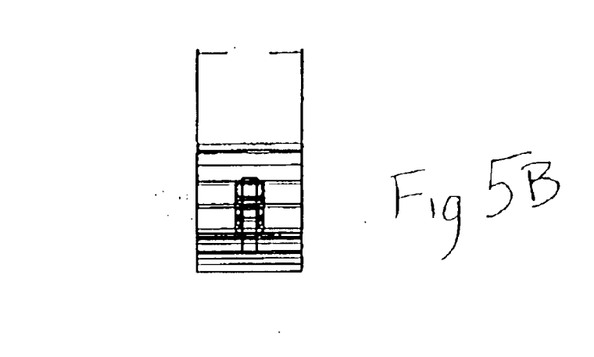
FIG. 5B is a second side-view of the product illustrated in FIG. 5A.
Figure 5C:
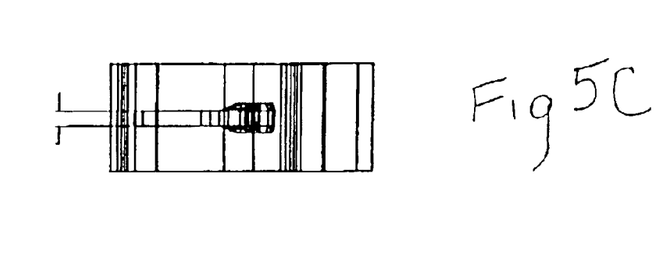
FIG. 5C is an end-view of the product illustrated in FIG. 5A.

Referring now to FIGS. 5A–5C, FIGS. 5A–5C illustrate an expandable material having a similar configuration to that illustrated in FIGS. 3A–4C except that material 50 includes an expandable fastener 51, protuberance 52, opening 53 and extension 54. Material 50, similar to the materials illustrated in FIGS. 1–4 can be injection molded, can be fabricated into a wide range of configurations. The particular configuration illustrated in FIGS. 5A–5C is especially suited for sealing an automotive C-pillar.

Figure 6:
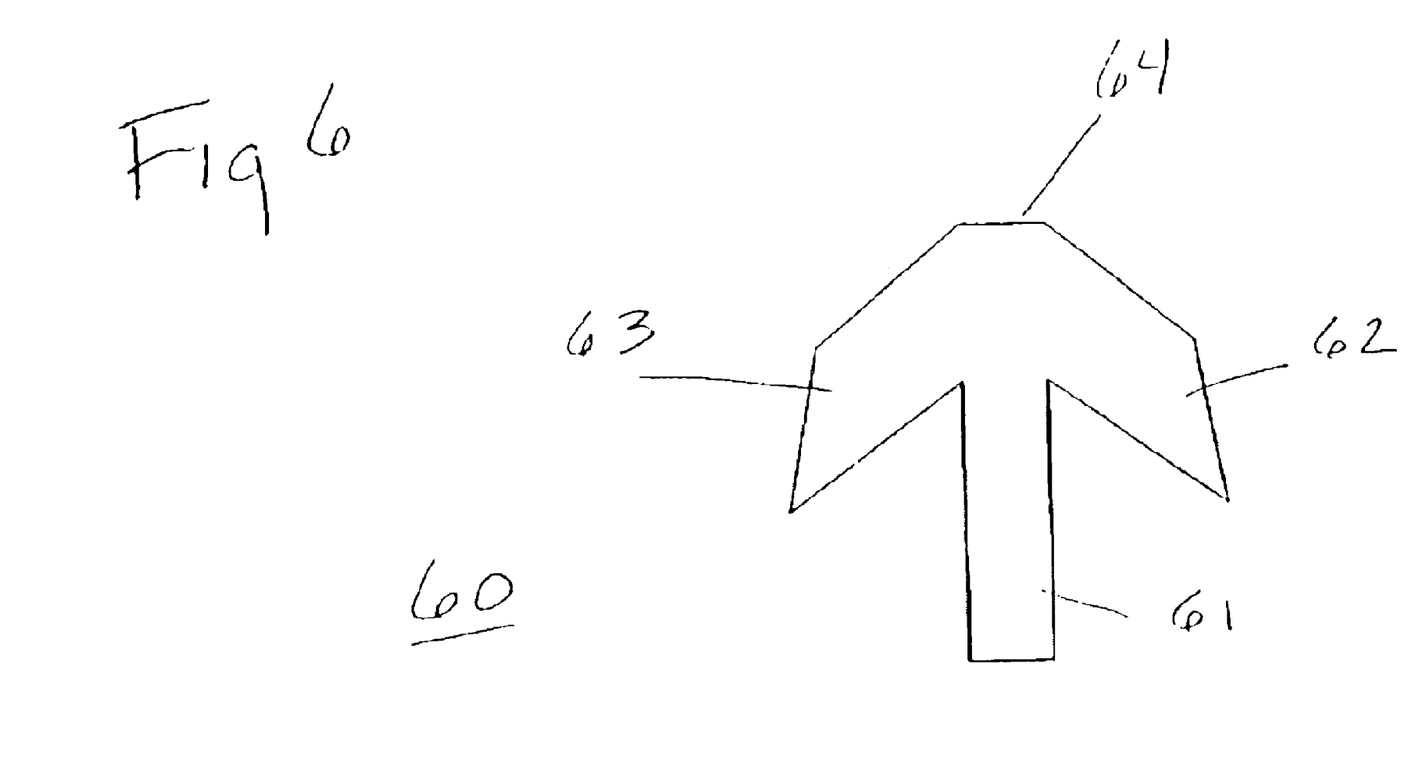
FIG. 6 is an overhead view of a further aspect of the instant invention that can be compression fit within a cavity.

Referring now to FIG. 6, FIG. 6 illustrates a self-retaining expandable material 60 that employs compression fitting. Material 60 comprises shank portion 61, compressible side portions 62 and 63 and end 64. Material 60 can be inserted into a desired location (e.g., within a cavity), by manually gripping shank portion 61 and inserting end 64 into the location until at least one of side portions 62 and 63 are compressed towards shank 64. Side portions 62 and/or 63 retain material 60 in a self-retained position. If desired, shank portion 61 can have embossed markings that can be used for gauging the depth that the material 60 has been inserted into a cavity.

If desired, the composition can incorporate a reinforcing member. Examples of such reinforcing members comprise glass mesh, mats, plastic or nylon supports, among other materials capable of surviving the expansion temperature and enhancing the structural integrity of either the unexpanded or expanded composition.

In addition, at least a portion of the inventive composition can be laminated with a film, foil, web, sheet, among others. The laminate can be a temporary component of the composition such as a release film and/or permanently in contact with the composition. While any suitable laminate can be employed, examples of such laminates are disclosed in U.S. Pat. Nos. 4,803,104 and 6,030,701; the disclosure of which are hereby incorporated by reference.

While the above Description emphasizes expandable compositions for use in automotive applications, the inventive composition can be employed in a virtually unlimited array of applications. Examples of such applications can include one or more of sealants for aircraft, golf cars, agricultural equipment, marine vessels, an insulating member, a residential or industrial sealant, among other applications. The inventive compositions can be extruded, pumped into a desired location, sprayed, preformed (e.g., injection molded), among other methods for using sealants.

The following Examples are provided to illustrate not limit the scope of the invention as defined by the appended claims. The percentages in these Examples are weight percent (%).

EXAMPLE 1

A composition was prepared by combining 100 parts per hundred resin (phr) of base polymer (Bynel™ 3860 supplied by the DuPont Company), 1.5 phr of hydrocarbon based process oil (Tufflo® 500 WsChem-Hall Inc.), 6.7 phr of Piccotac® hydrocarbon resin, 0.7 phr pounds TMTD™ supplied by AkroChem, and 10 phr of expansion agent (6.7 phr of Celogen OT and 3.3 phr of Celogen 765). 0–1 phr of peroxide supplied by Akrochem.

EXAMPLE 2

A composition was prepared by combining 100 phr of base polymer (Bynel™ 3860 supplied by the DuPont Company), 20 phr ethylene copolymer (Primacor 5990 supplied by Dow Chemical), 12 phr of expansion agent (8 phr of Celogen OT and 4 phr of Celogen 765), 8 phr of hydrocarbon resin and 0.8 phr TMTD™ (supplied by AkroChem), and 0.5 pounds BIK-OT (supplied by Uniroyal Chemical Company). 0–1 phr of peroxide supplied by Akrochem.

EXAMPLE 3

A composition substantially the same as that disclosed by Example 2 was prepared with the exception that 0.04 phr of colorant (supplied by AkroChem) was added.

EXAMPLE 4

The composition of Examples 1–3 were prepared by admixing the base polymer and, if present, 14% supplemental polymer (Primacor™ ethylene acrylic acid polymer) together in a Baker-Perkin dispersion mixer. About 3.5 pounds (0.97%) of the aforementioned light processing oil was added to the mixer and mixed for 5 to 10 minutes. The 0–2% curing agent (TMTD™ tetramethylthiuram disulfide) and expansion agent (Celogen™ 765) were added to the mixer, and the combination was mixed for 3 to 5 minutes. The remaining processing oil was added and mixing continued for 3–5 minutes. A blue colorant and additional expansion agent (Celogen™ OT) were added to the mixer and mixed for 3 to 10 minutes.

The aforementioned expansion agents had been pretreated with 10–28% naphtheninic binder supplied by Polychem or ElastoChem. The pre-treated expansion agents possessed at least about 90% of the activity of untreated expansion agents.

The mixed composition comprised pellets or particulate of base polymer substantially uniformly coated. The composition has no reportable dusting characteristics.

EXAMPLE 5

The compositions of Example 4 are dispensed into 5 gallon to 500 pound containers. The composition is then shaped by being injection molded in a Boy 30 Ton or Toyo Model No. TM200 injection molding apparatus to form an injection molded part. The injection molded or extruded article is baked at a temperature of about 300 to 400 F. The baking in turn causes the expansion agent within the article to become active thereby expanding the article's volume by at least 600%.

EXAMPLE 6

The compositions of Example 4 are dispensed into an extruder. The composition is extruded to form a sheet structure. The composition is extruded by a 12/1 extruder that has been modified to include a compression flight screw. The following outlines the extrusion parameters: 180 lbs/hr feed rate, 160 F. feed temperature, 200 F. compression section temperature; and 220 F. head/die temperature. The extruded article is expanded by being heated.

EXAMPLE 7

Example 2 was repeated with the exception that ethylene copolymer was replaced with 8–20 phr of polybutadiene polymer. The polybutadiene was supplied by JSR Corp.

EXAMPLE 8

This Example describes making an injection molded composition that was employed as a stiffener on an intrusion beam within an automotive passenger door. The components of the composition are listed in the following Table.

TABLE

| Supplier | Material | Phr |
| --- | --- | --- |
| Ameripol-Synpol | SBR rubber | 100 |
| Petrolite | Process Aid | 87.5 |
| Exxon | Hydrocarbon resin | 6.3 |
| DuPont | EVA resin | 300 |
| Polychem | Blowing agent | 21.8 |
| Atochem | Peroxide | 6.3 |
| Akrochem | TMTD | 6.3 |
| Cabot | Carbon Black | 1.9 |
| Mozel | Filler | 100 |

The heat expandable composition was mixed in a lab BakerPerkins dispersion blade. The mixed composition was injection molded into a single cavity mold having the shape substantially as illustrated in FIGS. 1A and 1B.

The injection molded article was located or clipped about an intrusion beam. The beam was introduced into a forced air oven chamber and exposed to a temperature of about 325 F. for a period of twenty minutes. The composition expanded between the beam and an adjacent steel member (that represented the interior portion of an automotive door skin). The composition adhered to the interior portion of the door skin as well as the intrusion beam thereby reducing panel mobility. By reducing panel mobility the inventive composition reduces noise caused by rattles, improves strength of the door, among other desirable properties.

Examples 9–11 demonstrate injection moldable compositions that were fabricated in accordance with the method of Example 8.

EXAMPLE 9

| TRADE NAME | COMPONENT | AMOUNT |
| --- | --- | --- |
| Bynel 3860 | Maleic anhydride modified copolymer of ethylene and vinyl acetate | 100 phr |

EXAMPLE 9-continued

| TRADE NAME | COMPONENT | AMOUNT |
|---|---|---|
| Picotac B | Hydrocarbon resin | 6.7 phr |
| Tufflo 500 | Hydrocarbon process oil | 1.5 phr |
| TMTD | Tetramethylthiuram disulfide | 0.7 phr |
| Celogen OT | Hydrazide expansion agent | 6.7 phr |
| Celogen 765 | Expansion agent | 3.3 phr |

EXAMPLE 10

| TRADE NAME | COMPONENT | AMOUNT |
|---|---|---|
| Bynel 3860 | Maleic anhydride modified Copolymer of ethylene and vinyl acetate | 100 phr |
| Primacore 5990 | Acid mod. Ethylene copolymer | 100 phr |
| Picotac B | Hydrocarbon resin | 0–20 phr |
| Tufflo 500 | Hydrocarbon process oil | 68 phr |
|  | Tetramethylthiuram | 0–1.8 phr |
| Peroxide | Commodity | 0–1 phr |
| Celogen OT | Expansion agent | 0–1 phr |
| Celogen 765 | Expansion agent | 6–8 phr |
| Bik-OT | Expansion agent | 0–4 phr |

EXAMPLE 11

| TRADE NAME | COMPONENT | AMOUNT |
|---|---|---|
| SBR 1009 | Styrene Butadiene | 46.2 phr |
| Primocor 5990 | Acid mod. Ethylene copolymer | 30.1 phr |
| SBR 1205 | Styrene Butadiene | 23.1 phr |
| Elvax 260 | Ethylene Vinyl Acetate | 100 phr |
| RB 8101.2 | Polybutadiene | 76.9 phr |
| 195 wax | Clay treated wax | 33.8 phr |
| Resin 7312 | Hydrocarbon resin | 3.8 phr |
| QW200 | Calcium Carbonate | 61.5 phr |
| Carbon black | Organic Peroxide | 3.8 phr |
| TMTDT | Tetramethylthiuram disulfide | 5.4 phr |
| Celogen OT | Hyrazide | 15.4 phr |

Example 12 illustrates a moldable composition that was fabricated to possess the configuration illustrated in FIG. 6.

EXAMPLE 12

| Material Name | Supplier | Quantity | Wt % | Material type |
|---|---|---|---|---|
| SBR 1009 | Ameripo-Synpol | 165 | 30.05 | styrene butadiene rubber |
| Nordel IP 4725 | Dupont-Dow | 150 | 27.32 | ethylene propylene rubber |
| RT2730 (APAO) | Huntsman | 100 | 18.21 | Poly alpha olefin |
| MV2514 acetate | Exxon | 50 | 9.11 | Ethylene vinyl |
| Gilsonite Multi-grade | Lexco | 15 | 2.73 | Hydrocarbon resin |
| Carbon Black Regal 300 | Cabot | 2 | 0.36 | carbon black |
| Celogen AZ180 | Uniroyal | 50 | 9.11 | Azodicarbonamide |
| Superfine Sulfur | Akrochem | 5 | 0.91 | sulfur |
| Zinc Oxide | Morton-Myers | 10 | 1.82 | zinc oxide |
| Industrene R | Barton | 2 | 0.36 | stearic acid |
|  | Solvents | 549 |  |  |

The heat expandable composition of Example 12 was mixed in a lab BakerPerkins mixer with dispersion blade. The following mix procedure was utilized.

SBR rubber, EPDM rubber, Eva resin, and approximately ⅓ of the APAO were blended. Blend was allowed to reach a temperature of 140° F., and mix until homogeneous. The mixer was stopped, and the Gilsonite, zinc oxide, stearic acid, blowing agent, sulfer, carbon black and the remainder of the APAO were added The composition was mixed until homogeneous, and attained a mix temperature of approximately 155° F. The mixed composition was extruded and die cut into the configuration shape illustrated in FIG. 6.

The shaped article was located in opening of a steel 1×2 tubular frame rail. The frame rail was introduced into a forced air oven chamber and exposed to a temperature of about 385 F. for a period of twenty minutes. The composition expanded and filled the interior of the frame rail. The composition adhered to the interior portion of the rails.

What is claimed is:

1. A self-retaining, injection molded and heat expandable automotive sealant composition comprising styrene-butadiene rubber, ethyl vinyl acetate, at least one expansion agent, at least one catalyst, at least one filler and combinations thereof, wherein the composition is substantially free of ionic compounds, wherein the sealant comprises a compressible protuberance dimensioned for insertion into a member to be sealed and at least two extensions that extend along at least a portion of an exterior surface of the member to be sealed.

2. The automotive sealant of claim 1 further comprising at least one opening.

3. The automotive sealant of claim 1 wherein the member to be sealed comprises at least one member selected from the group consisting of an A-pillar, B-pillar or C-pillar.

4. The automotive sealant of claim 1 wherein expansion agent comprises at least one member selected from the group consisting of azodicarbonamides, p,p'oxybis (benzene-sulfonyl hydrazide) and diphenylozide-4, 4'disulphohydrazides.

5. The automotive sealant of claim 1 wherein the sealant is self-retaining.

6. An automotive cavity sealant comprising a heat expandable sealant composition comprising styrene-butadiene rubber, ethyl vinyl wherein a first portion of the expandable sealant composition is configured to maintain the sealant in a fixed position adjacent to the member to be sealed and at least two other portions of the expandable composition that extend along an exterior surface of the member to be sealed.

7. The automotive cavity sealant of claim 6 wherein the sealant is self-retaining.

8. The automotive cavity sealant of claim 6 wherein the first portion defines a gripping portion.

9. The automotive cavity sealant of claim 6 wherein the first portion comprises a fastener that is compressed within the member to be sealed.

10. The automotive sealant of claim 6 wherein said sealant defines at least one opening.

* * * * *